US010745073B2

United States Patent
Tsurumi et al.

(10) Patent No.: US 10,745,073 B2
(45) Date of Patent: Aug. 18, 2020

(54) STRADDLE-TYPE SEAT AND COVER MEMBER

(71) Applicants: TS TECH CO., LTD., Asaka-shi, Saitama (JP); HONDA MOTOR CO., LTD., Tokyo (JP)

(72) Inventors: Kazuhiro Tsurumi, Tochigi (JP); Ryuji Isobe, Tochigi (JP); Kosuke Maeda, Tochigi (JP); Shinichiro Motoda, Tochigi (JP); Gen Tanabe, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 15/933,651

(22) Filed: Mar. 23, 2018

(65) Prior Publication Data

US 2018/0273125 A1   Sep. 27, 2018

(30) Foreign Application Priority Data

Mar. 24, 2017 (JP) ................................. 2017-059438

(51) Int. Cl.
*B62J 1/20* (2006.01)
*B62J 1/12* (2006.01)
*B62J 1/28* (2006.01)

(52) U.S. Cl.
CPC . *B62J 1/20* (2013.01); *B62J 1/12* (2013.01); *B62J 1/28* (2013.01)

(58) Field of Classification Search
CPC .................. B62J 1/12; B62J 1/20; B62J 1/28
See application file for complete search history.

(56) References Cited

U.S. PATENT DOCUMENTS 5,214,811 A   6/1993  Priem
5,544,937 A   8/1996  Hanagan
(Continued)

FOREIGN PATENT DOCUMENTS

| CN | 101380981 A | 3/2009 |
| JP | S58-049564 A | 3/1983 |
| JP | S62-039600 U | 3/1987 |

(Continued)

OTHER PUBLICATIONS

Extended European Search Report issued in related application EP 18163046.8, dated Aug. 13, 2018, 9 pages.
(Continued)

*Primary Examiner* — David R Dunn
*Assistant Examiner* — Tania Abraham
(74) *Attorney, Agent, or Firm* — Faegre Drinker Biddle & Reath LLP

(57) ABSTRACT

Provided is a straddle-type seat configured to prevent a cover member from being detached and to increase a crime prevention property. The cover member is configured to close a through hole formed on a seat surface. The seat is configured to support a seated occupant in a straddle state and includes a seat main body on which the occupant sits, and a cover member that covers the through hole formed in the seat main body. The cover member includes a lid portion that closes the through hole on a top surface of the seat main body, and a downward extension portion that downwardly extends from the lid portion. The downward extension portion is locked to a T-like shape protrusion formed on a bottom surface of the seat main body.

16 Claims, 17 Drawing Sheets

(56) References Cited

U.S. PATENT DOCUMENTS 7,065,809 B1 6/2006 Wesline et al.
2018/0141605 A1 5/2018 Chiba

FOREIGN PATENT DOCUMENTS

JP 5723714 B2 5/2015
JP 2018-083455 A 5/2018

OTHER PUBLICATIONS

Office Action issued in related application JP 2017-059438, dated Sep. 25, 2018, with machine generated English language translation, 7pages.

STRADDLE-TYPE SEAT AND COVER MEMBER

CROSS REFERENCE TO RELATED APPLICATIONS

This application is based upon and claims the priority benefit of Japanese Patent Application No. JP 2017-059438, filed Mar. 24, 2017, the contents being incorporated herein by reference.

BACKGROUND

The present disclosure relates to a straddle-type seat and a cover member, and more particularly to a straddle-type seat configured to prevent a cover member from being detached, and increasing a crime prevention property of the cover member.

A conveyance such as a two-wheeled motor vehicle employs a straddle-type seat on which an occupant sits in a straddle state. As this straddle-type seat, as described in Japanese Patent Publication JP5723714B2, for example, there is known a seat configured to enable attachment of a storage box to a lock portion provided on a luggage carrier of the seat. The lock portion is exposed in a state in which the storage box is detached in such a seat, and a lid for covering the lock portion is thus attached.

Incidentally, if a hole for attaching a detachable component is provided in a seating portion of the seat, and a cover member for closing the hole in a state in which the component is detached is formed into a simple lid shape, there poses such a problem that the cover member is detached when an occupant gets on and off or impact is applied. Moreover, if the cover member takes the simple lid shape, there is a room for an increase in the crime prevention property.

SUMMARY

The present disclosure has been made in view of the above-described problems, and various embodiments provide a straddle-type seat configured to prevent a cover member for closing a through hole formed on a seat surface from being detached, and increasing the crime prevention property of the cover member.

The problems described before are solved by a straddle-type vehicle seat according to an embodiment of the present disclosure. In an embodiment, the straddle-type seat is configured to support a seated occupant in a straddle state and includes a seat main body on which an occupant seats, and a cover member that covers a through hole formed in the seat main body. The cover member includes a lid portion that closes the through hole on a top surface of the seat main body, and a downward extension portion that downwardly extends from the lid portion. The downward extension portion is locked to a lock portion formed on a bottom surface of the seat main body.

Moreover, the problems described above are solved by a cover member according to an embodiment of the present disclosure. The cover member is attached to a seat main body in which a through hole is formed in a straddle-type seat. The straddle-type seat is configured to support a seated occupant in a straddle state and includes a lid portion that closes the through hole on a top surface of the seat main body, and a downward extension portion that downwardly extends from the lid portion. The downward extension portion is locked to a lock portion formed on a bottom surface of the seat main body.

With the straddle-type seat and the cover member, the cover member can readily be attached by locking the downward extension portion that downwardly extends from the lid portion of the cover member for closing the through hole formed on the seat surface to the bottom surface of the seat main body. Consequently, the cover member can be prevented from being detached, and a crime prevention property of the cover can be increased.

Moreover, in the above-mentioned straddle-type seat, preferably, the downward extension portion is formed in a tongue-like shape, and an end portion of the downward extension portion is locked to the lock portion. With this configuration, the cover member can be locked to the seat main body at the position remote from the seat surface. Consequently, it is difficult to detach the cover member in a state in which the seat is not detached from the vehicle.

Moreover, in the above-mentioned straddle-type seat, preferably, the downward extension portion is deformable, and is locked to the lock portion in a curved state. With this configuration, workability when the cover member is attached to the bottom surface of the seat main body can be increased.

Moreover, in the above-mentioned straddle-type seat, preferably, the lock portion is formed as a protrusion, and a latch hole in which the protrusion is latched is formed in the downward extension portion. With this configuration, the mechanism for locking the cover member to the bottom surface of the seat main body can be implemented as a simple structure. Moreover, an operation of attaching the cover member to the bottom surface of the seat main body is simplified.

Moreover, in the above-mentioned straddle-type seat, preferably, the protrusion is formed in a T shape, and a width of a head portion of the protrusion is wider than a width of the latch hole. With this configuration, the cover member can be prevented from being detached from the lock portion.

Moreover, in the above-mentioned straddle-type seat, preferably, a flange portion is formed on an outer periphery of the lid portion. With this configuration, backlash of the cover member can be suppressed.

Moreover, the above-mentioned straddle-type seat, preferably, further includes an engagement member that is fixed in a state in which the engagement member is inserted into the through hole of the seat main body, and engages with the cover member, a concave portion is formed in the flange portion, and the engagement member includes a convex portion fit to the concave portion of the flange portion. With this configuration, a displacement of the cover member can be suppressed. Moreover, the backlash of the cover member can further be suppressed.

Moreover, in the above-mentioned straddle-type seat, preferably, the engagement member further includes an inclined portion inclined toward a center of the through hole. With this configuration, water is easily discharged from the engagement member via the through hole. Consequently, accumulation of the water in the engagement member can be suppressed.

Moreover, in the above-mentioned straddle-type seat, preferably, a bottom end portion of the engagement member is fixed to the bottom surface of the seat main body. With this configuration, a bottom portion of the engagement member can be spread. Consequently, the downward extension portion of the cover member is easily passed through the bottom portion of the engagement member. Moreover, the spread of the bottom portion of the engagement member promotes the downward discharge of the water from the engagement member.

Moreover, in the above-mentioned straddle-type seat, preferably, the downward extension portion comprises a protruded portion formed on an end portion, and a latch hole in which the protruded portion is latched is formed in the lock portion. With this configuration, the mechanism for locking the cover member to the bottom surface of the seat main body can be implemented as a simple structure. Moreover, the operation when the cover member is attached to the bottom surface of the seat main body is simplified.

According to various embodiments of the present disclosure, the cover member can be prevented from being detached, and the crime prevention property can be increased. According to an embodiment of the present disclosure, the cover member can be locked to the seat main body at the position remote from the seat surface. According to an embodiment of the present disclosure, the workability when the cover member is attached to the bottom surface of the seat main body can be increased. According to an embodiment of the present disclosure, the operation of attaching the cover member to the bottom surface of the seat main body is simplified. According to an embodiment of the present disclosure, the cover member can be prevented from being detached from the lock portion. According to an embodiment of the present disclosure, the backlash of the cover member can be suppressed. According to an embodiment of the present disclosure, the displacement of the cover member can be suppressed. According to an embodiment of the present disclosure, the water is easily discharged from the engagement member via the through hole. According to an embodiment of the present disclosure, the downward extension portion of the cover member is easily passed through the bottom portion of the engagement member. According to an embodiment of the present disclosure, the mechanism for locking the cover member to the bottom surface of the seat main body can be implemented as a simple structure.

BRIEF DESCRIPTION OF THE DRAWINGS

Various embodiments of the invention are illustrated in the drawings, in which.

DETAILED DESCRIPTION

A description will now be given of a seat 2 (an example of a straddle-type seat) according to an embodiment (hereinafter referred to as this embodiment) of the present disclosure referring to FIG. 1 to FIG. 17. It should be noted that although the seat 2 according to this embodiment is an example in which the straddle-type seat according to the present disclosure is applied to a seat for a two-wheeled motor vehicle, the seat 2 is simply an example for promoting understanding of the present disclosure, and does not limit the present disclosure. In other words, it should be understood that the shapes, dimensions, arrangements, and the like described herein can be changed or improved without departing from the spirit of the present disclosure, and equivalents thereof are included in the present disclosure. Moreover, it is assumed that respective directions described hereinafter, which are a front to back direction, a right and left direction, and a top to bottom direction, coincide with respective directions viewed from a person seated on the seat 2.

Figure 1:
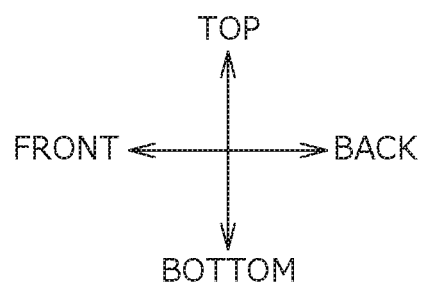
FIG. 1 is a diagram of a two-wheeled motor vehicle on which a seat according to an embodiment is mounted.
Figure 1:
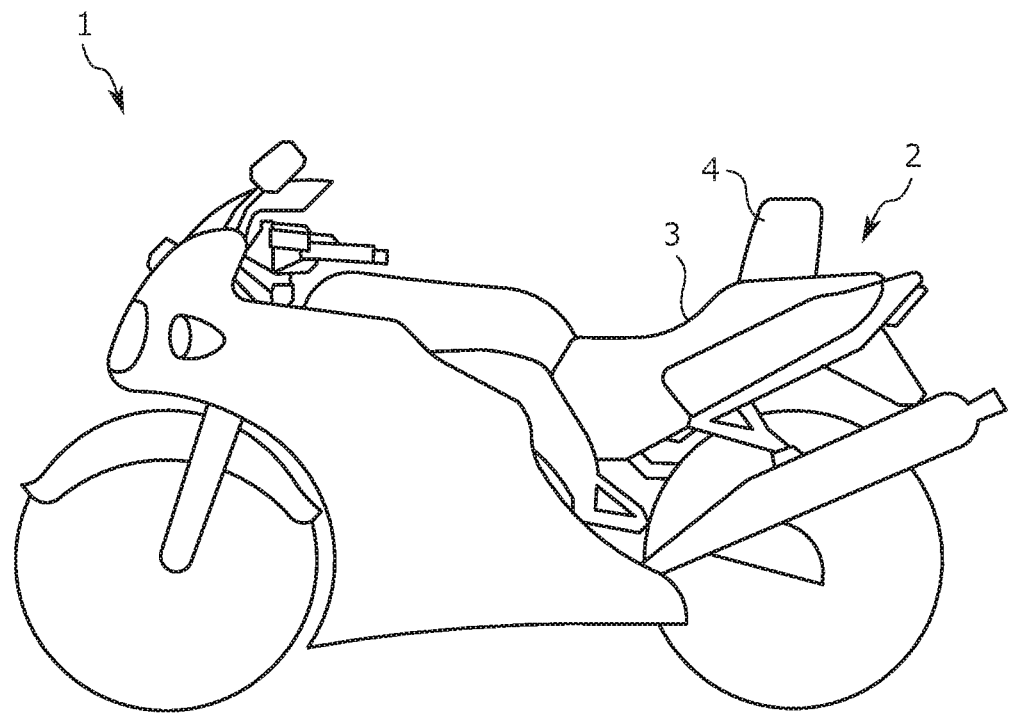

An appearance of the two-wheeled motor vehicle 1 on which the seat 2 according to this embodiment is mounted is shown in FIG. 1. It can be considered that the two-wheeled motor vehicle 1 is configured as a general two-wheeled motor vehicle with respect to features other than those of the seat 2 as shown in FIG. 1. It should be noted that the seat 2 is a seat having a saddle-like shape on which an occupant (rider) sits in a straddle state, and is provided for the two-wheeled motor vehicle 1 in a detachable manner. Specifically, attachment holes, not shown, are formed in the two-wheeled motor vehicle 1, and the seat 2 is attached to the two-wheeled motor vehicle 1 through the attachment holes with fasteners.

Figure 2:
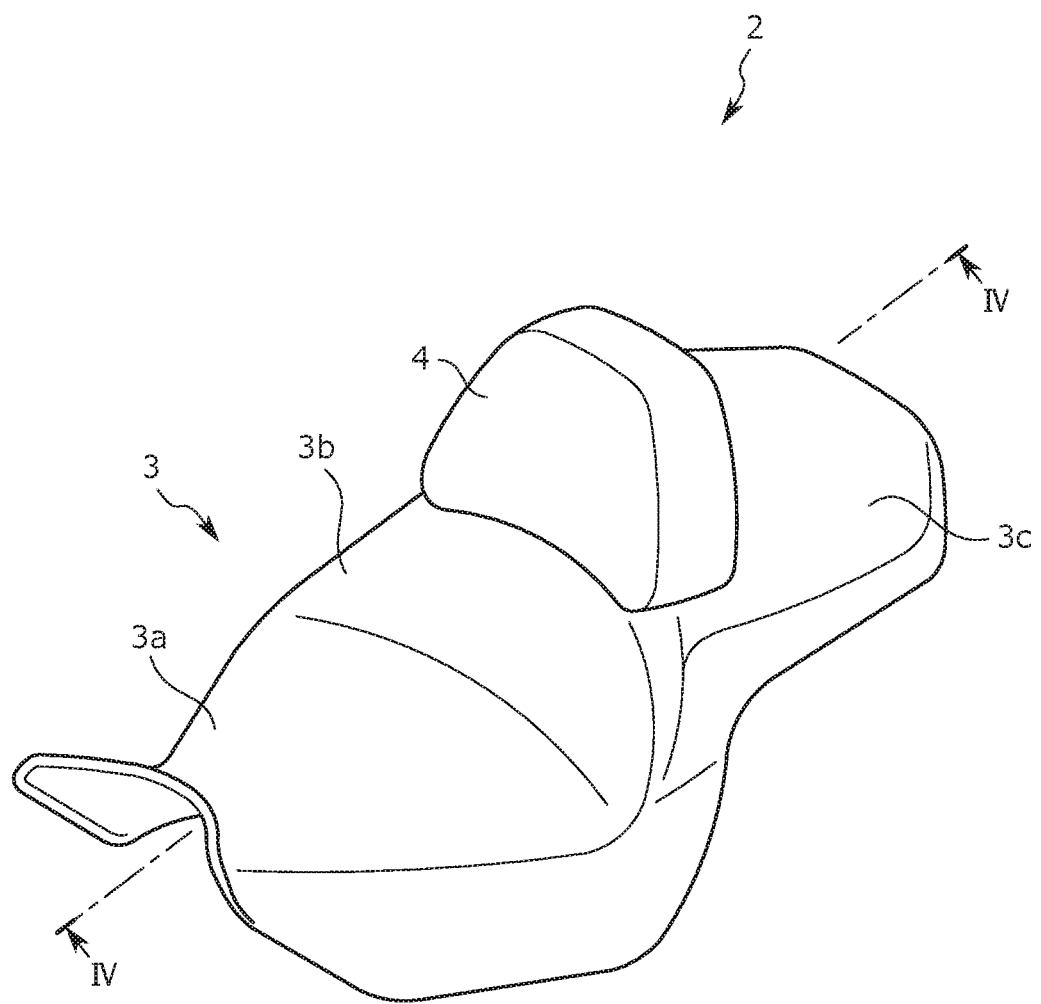
FIG. 2 is a perspective view of the seat of FIG. 1 in a state in which a backrest is attached.
Figure 2:
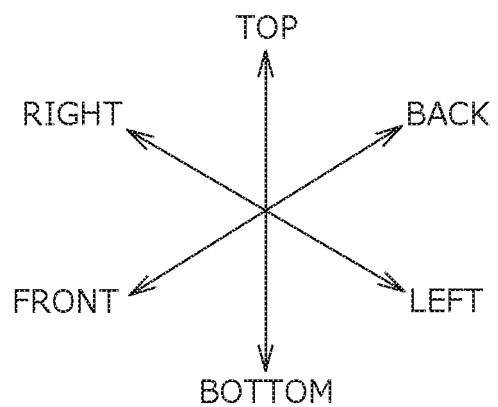

A description will now be given of a configuration of the seat 2 referring to FIG. 2. The seat 2 in such a state that a backrest 4 is attached to a seat main body 3 on which the occupant sits is shown in FIG. 2. It should be noted that the backrest 4 can be detached from the seat main body 3 as described below.

Figure 4:
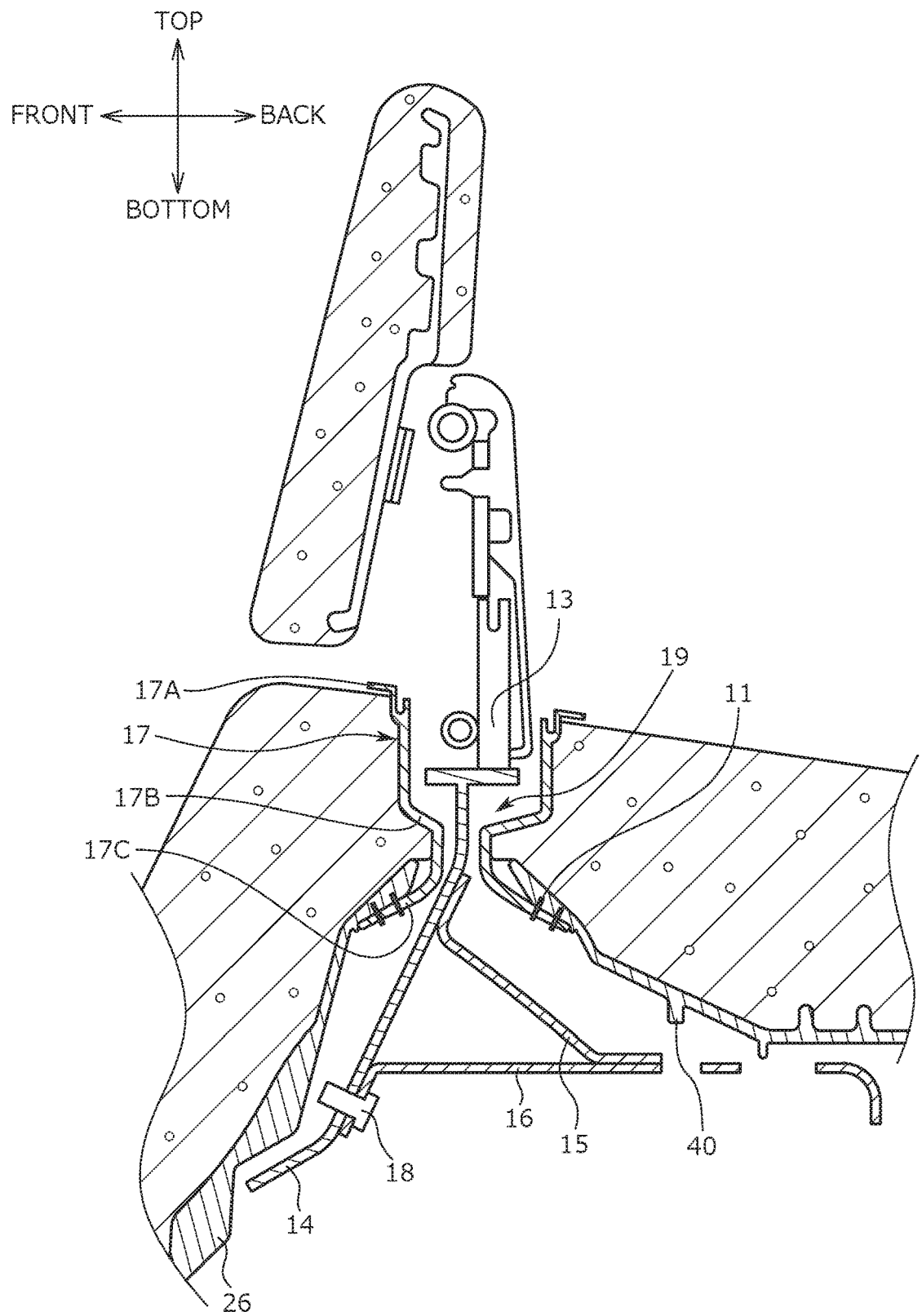
FIG. 4 is a cross sectional view made on a plane and in a direction indicated by arrows IV in a vicinity of the backrest in FIG. 2.

The seat main body 3 includes a seating portion 3a, an inclined portion 3b, and a back portion 3c in this sequence from a front portion as shown in FIG. 2. The seating portion 3a serves as a surface configured to support the buttocks of the occupant. The inclined portion 3b serves as a surface configured to support the lumbar region of the occupant. Specifically, the inclined portion 3b couples the seating portion 3a and the back portion 3c to each other, and forms a surface inclined obliquely backward from a back end of the seating portion 3a. The back portion 3c connects to the inclined portion 3b, and is provided at a position high in the top to bottom direction with respect to the seating portion 3a. The backrest 4 is detachably attached to the back portion 3c in this embodiment. For example, the back portion 3c can also be used as a rear seat for tandem riding when the backrest 4 is detached from the seat main body 3. Moreover, a cushion member 21 is placed on a resin frame 26, and the cushion member 21 is further covered with a skin material in a thickness direction of the seat main body 3 as shown in FIG. 4.

Figure 5:
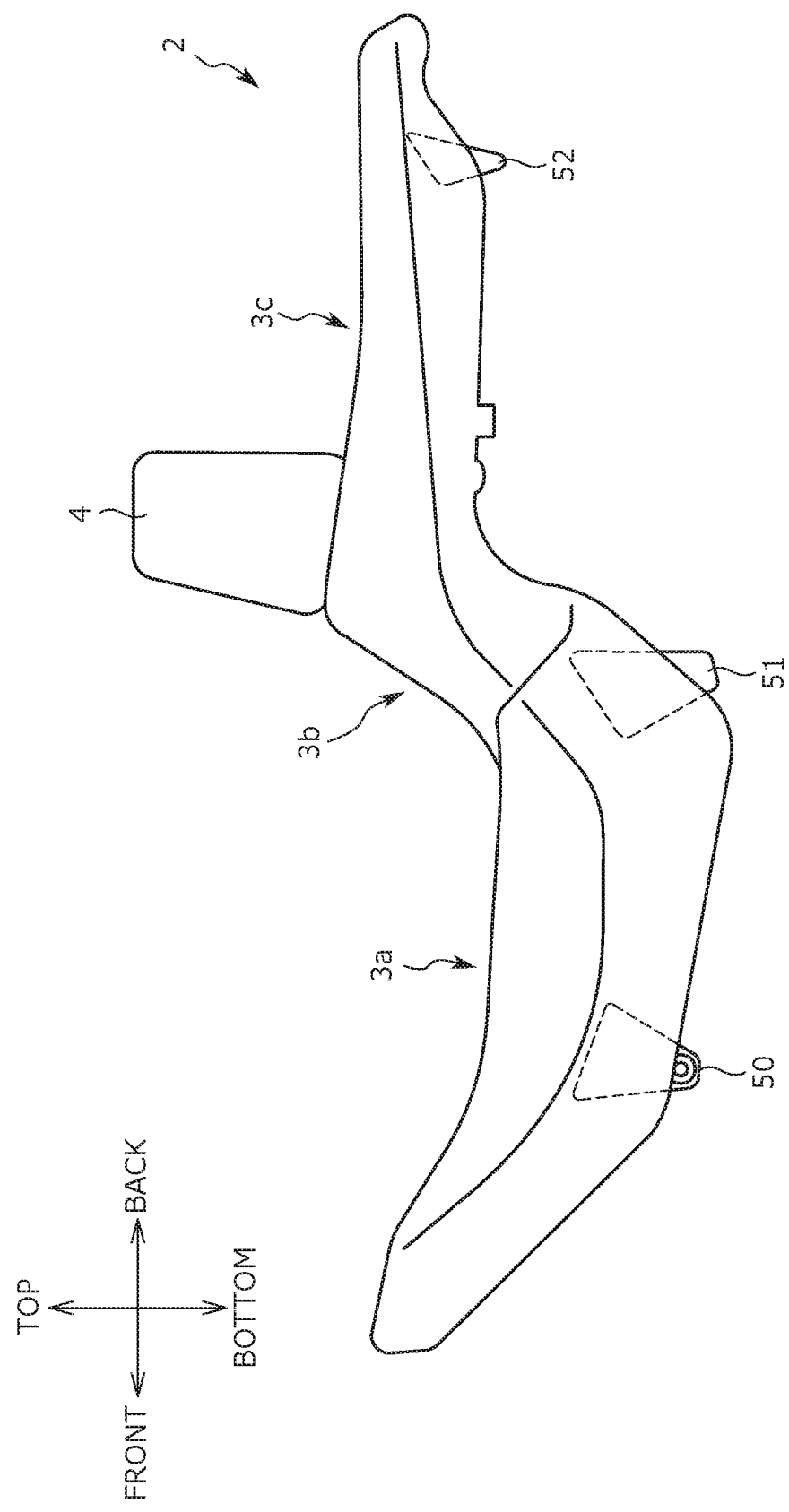
FIG. 5 is a side view of the seat of FIG. 1.

Moreover, a first protruded portion 50 is formed on a seat front portion, a second protruded portion 51 is formed on a seat center portion, and a third protruded portion 52 is formed on a seat back portion on a bottom portion of the seat 2 as shown in FIG. 5. The first protruded portion 50 is formed in a thick rib shape, and is provided below the seating portion 3a. The second protruded portion 51 is formed in a thick rib shape, and is provided below the inclined portion 3b. The third protruded portion 52 is formed in a conical shape (e.g., a cone), and is provided below the back portion 3c.

The first protruded portion 50, the second protruded portion 51, and the third protruded portion 52 are respectively provided in the seat front portion, the seat center portion, and the seat back portion in this way, and the seat 2 can thus be supported by the first protruded portion 50 and the second protruded portion 51 or by the second protruded portion 51 and the third protruded portion 52. Therefore, a rolled-in portion of the skin material of the seat 2 can be prevented from touching the ground, a work bench, or the like on which the seat is placed when maintenance on the seat 2 is performed. It should be noted that the third protruded portion 52 is formed into the conical shape, thereby providing effects in terms of suppression of an increase in the weight, an increase in rigidity, and an increase in productivity.

The backrest 4 is attached to a front portion of the back portion 3c, and forms surfaces for supporting the lumbar region and the back of the occupant in a state in which the occupant is seating on the seat main body 3.

Figure 3:
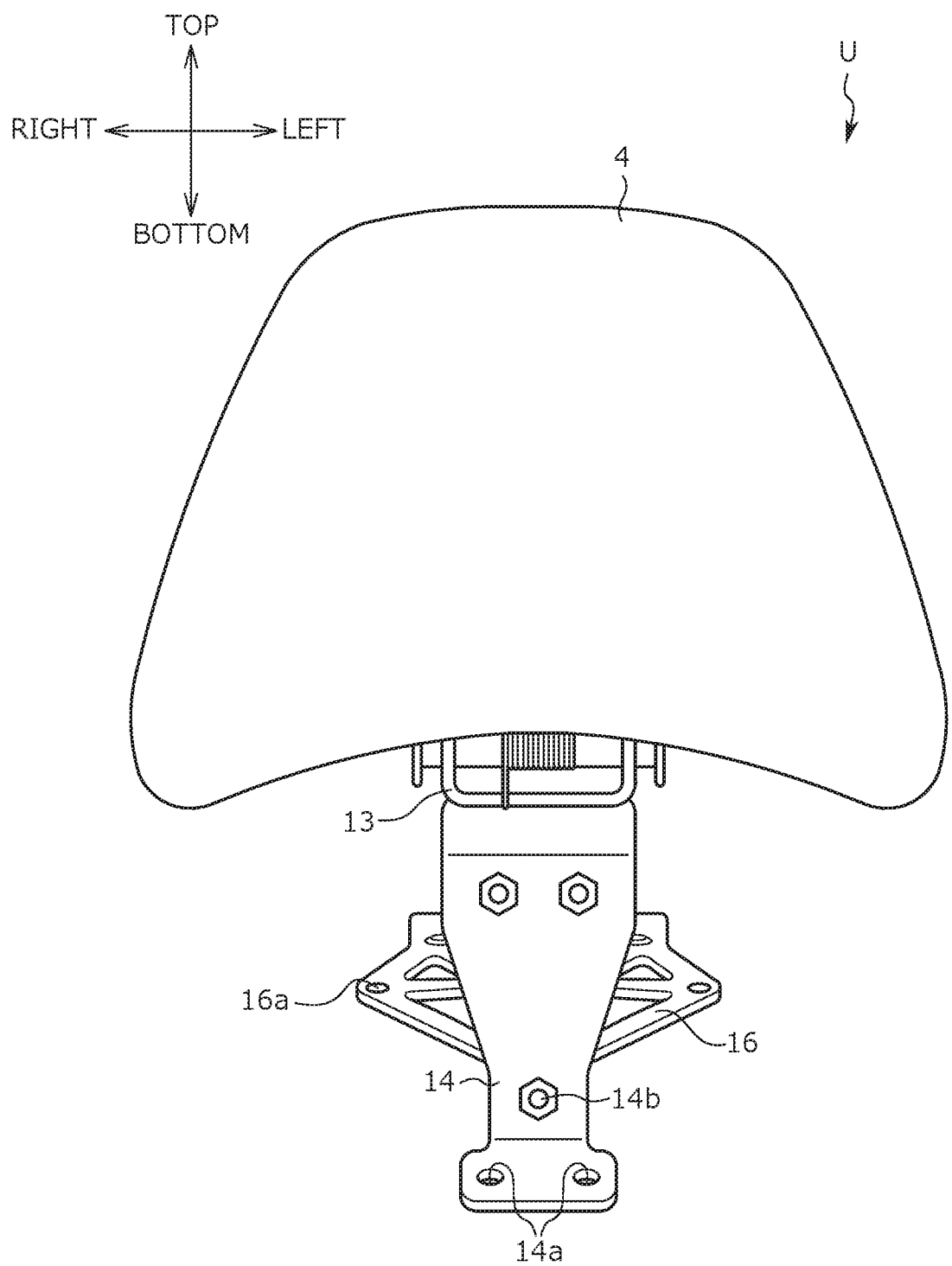
FIG. 3 is a front view of a backrest unit.

A backrest unit U, which is formed by unifying the backrest 4, a support member 13, a stay portion 14, a first bracket 15, and a second bracket 16, is shown in FIG. 3. Moreover, a cross sectional view of the seat 2 along a center line in a seat widthwise direction of the seat 2 in a state in which the backrest 4 is attached is shown in FIG. 4.

The support member 13 is attached to a back portion of the backrest 4 as shown in FIG. 3 and FIG. 4. It should be noted that a mechanism for adjusting a position and an angle of the backrest 4 may be provided at an attachment portion of the support member 13 and the backrest 4.

The stay portion 14 extends downward and is fixed to a bottom portion of the support member 13 through welding or fasteners.

The stay portion 14 is attached to the seat main body 3 in a state in which the stay portion 14 is passed through a through hole 19 formed in the top to bottom direction of the seat main body 3. Specifically, the stay portion 14 is fixed to the resin frame 26 of the seat main body 3 at attachment holes 14a formed in a bottom end portion through fasteners 18 such as bolts.

Multiple weld nuts 14b are provided in the top to bottom direction on the stay portion 14, and the first bracket 15 extends backward from the stay portion 14 and is fixed to the weld nuts 14b in a top portion through fasteners 18. Moreover, the second bracket 16 extends backward from the stay portion 14 and is fixed to the weld nuts 14b in a bottom portion of the stay portion 14 through the fastener 18. In an embodiment, back end portions of the first bracket 15 and the second bracket 16 are fixed to the resin frame 26 through the fasteners 18. It should be noted that it may be assumed that the second bracket 16 is fixed to the resin frame 26 through the fasteners 18 at attachment holes 16a of the second bracket 16.

An engagement member 17 is fixed to the seat main body 3 in a state in which the engagement member 17 is inserted through the through hole 19 as shown in FIG. 4. The engagement member 17 is configured to prevent water from entering into the skin material and the cushion member 21, and to discharge the water accumulated on a surface of the seat main body 3 via the through hole 19 to a rear surface side.

Figure 7:
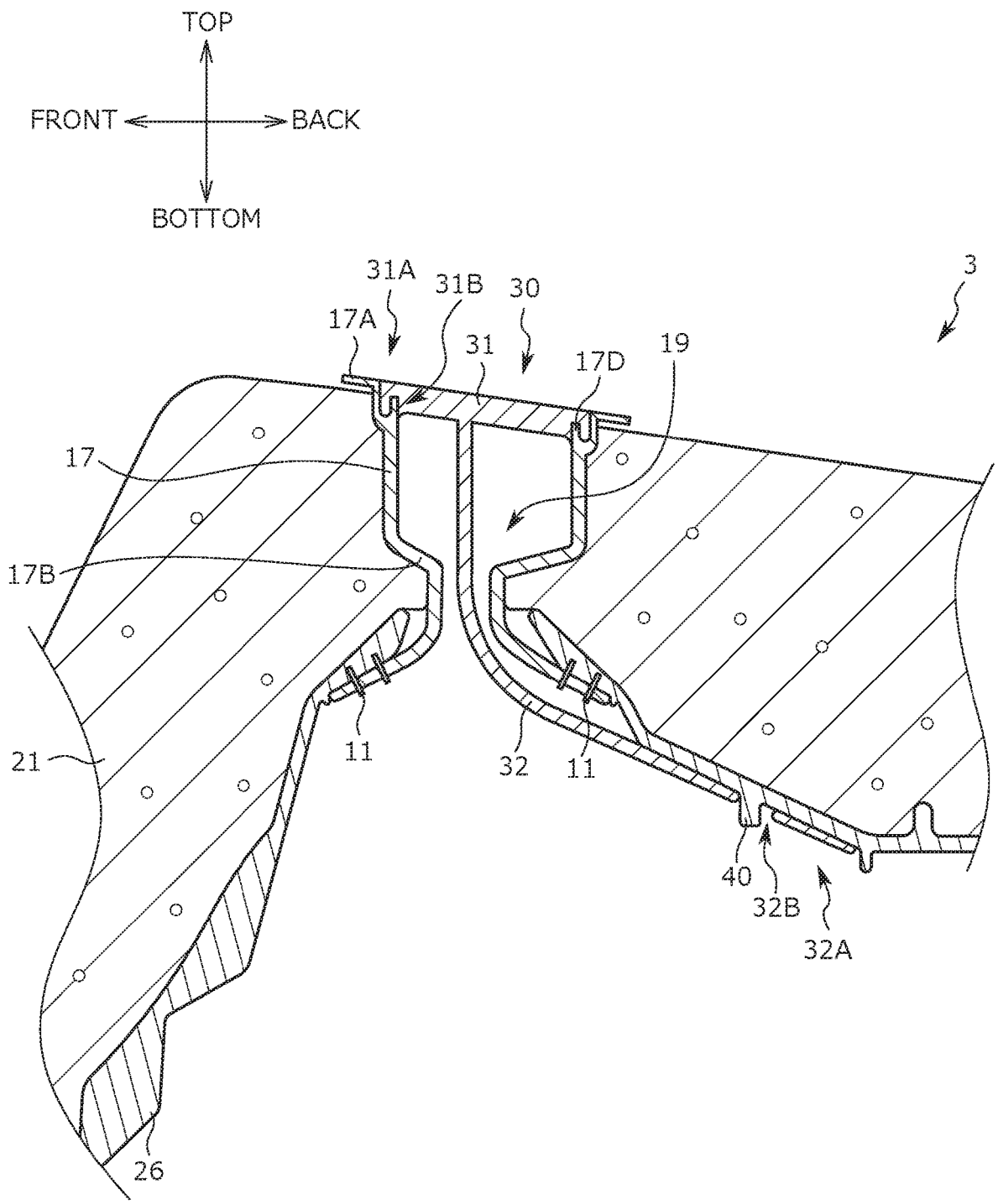
FIG. 7 is a cross sectional view made on a plane and in a direction indicated by arrows VII in a neighborhood of the cover member in FIG. 6.
Figure 9:
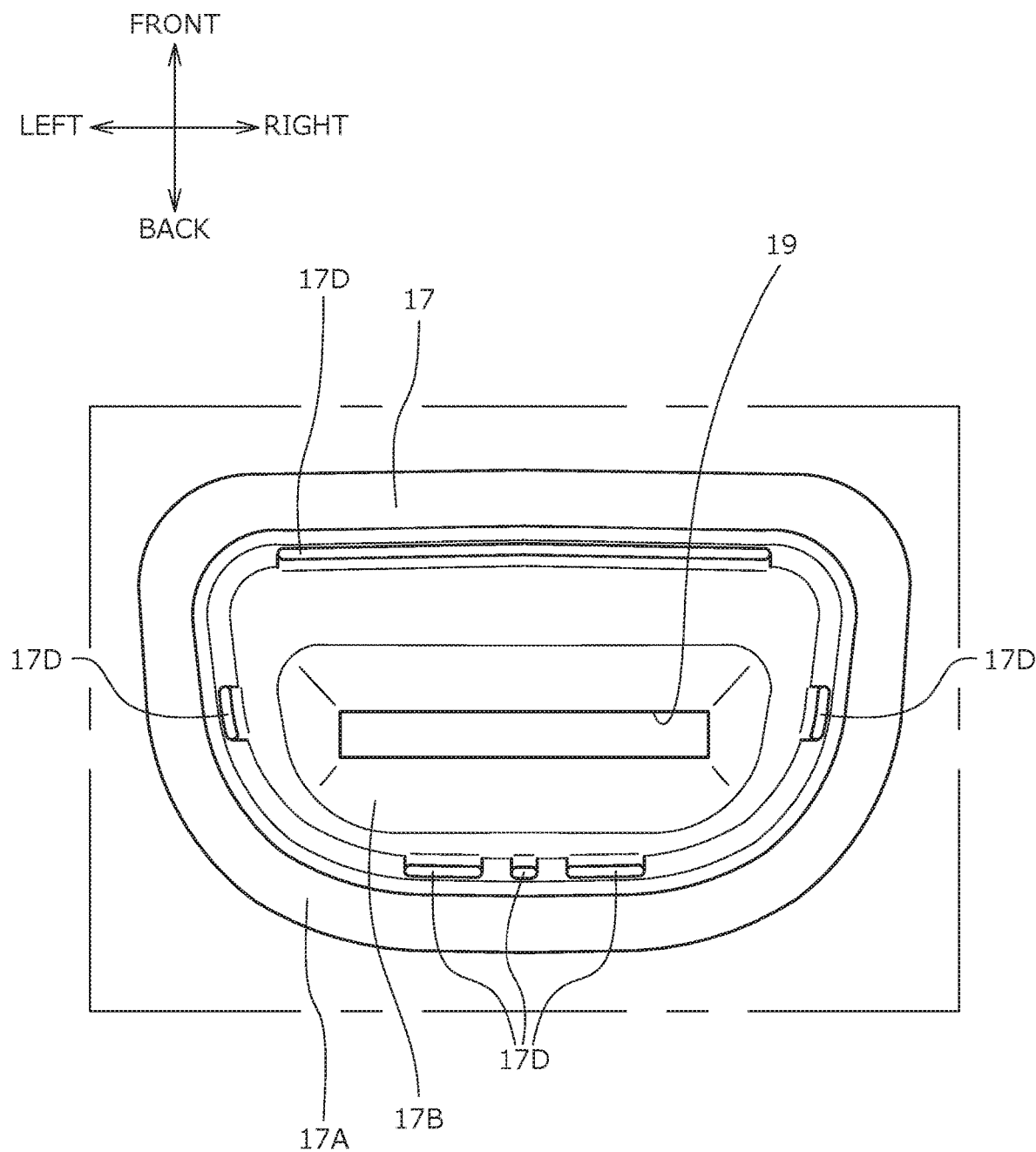
FIG. 9 is a top view in a state in which the cover member is detached.

A flange portion 17A at a top end of the engagement member 17 is formed on a top surface of the seat main body 3 as shown in FIG. 4, FIG. 7, and FIG. 9. An inclined portion 17B inclined toward a center of the through hole 19 is provided at a center portion in the top to bottom direction of the engagement member 17. Bottom end portions 17C below the inclined portion 17B of the engagement member 17 branch toward the front and back directions of the seat 2. Then, the branching bottom end portions 17C of the engagement member 17 are respectively attached to a bottom surface of the seat main body 3 (resin frame 26) through fixing metal fittings 11 such as staples or the like.

It should be noted that the backrest 4 is detached in the following sequence. First, after the seat 2 is detached from the two-wheeled motor vehicle 1, the fasteners 18 are loosened on the bottom surface side of the seat 2, thereby detaching the first bracket 15 and the second bracket 16 from the stay portion 14. Then, the unified body of the backrest 4, the support member 13, and the stay portion 14 can be detached from the seat main body 3 by pulling up the backrest 4 in the state described before. It should be noted that the state described before is a state in which the engagement member 17 and the through hole 19 are exposed on the top surface of the seat main body 3 as shown in FIG. 9.

Figure 6:
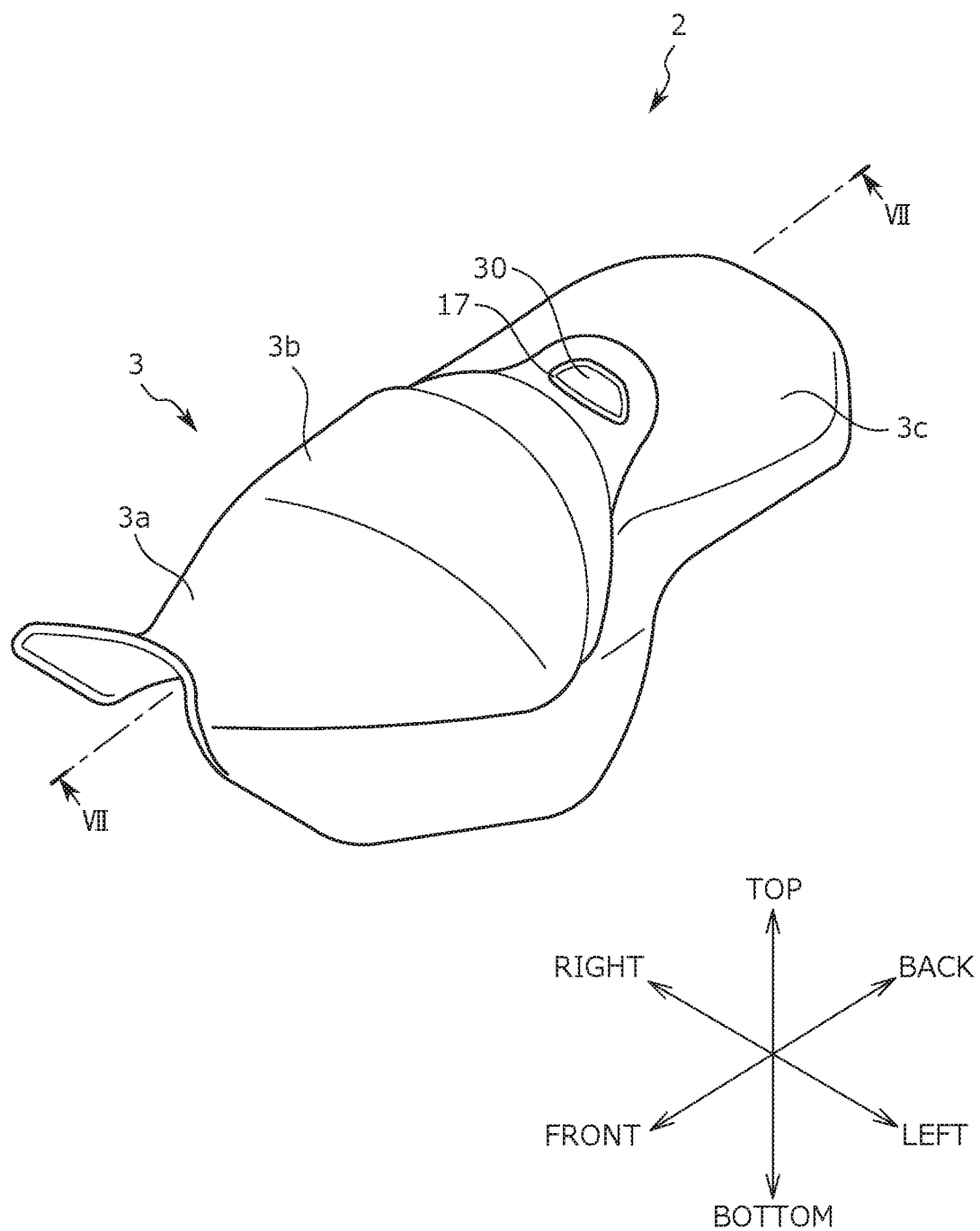
FIG. 6 is a perspective view of the seat in a state in which a cover member is attached.
Figure 8:
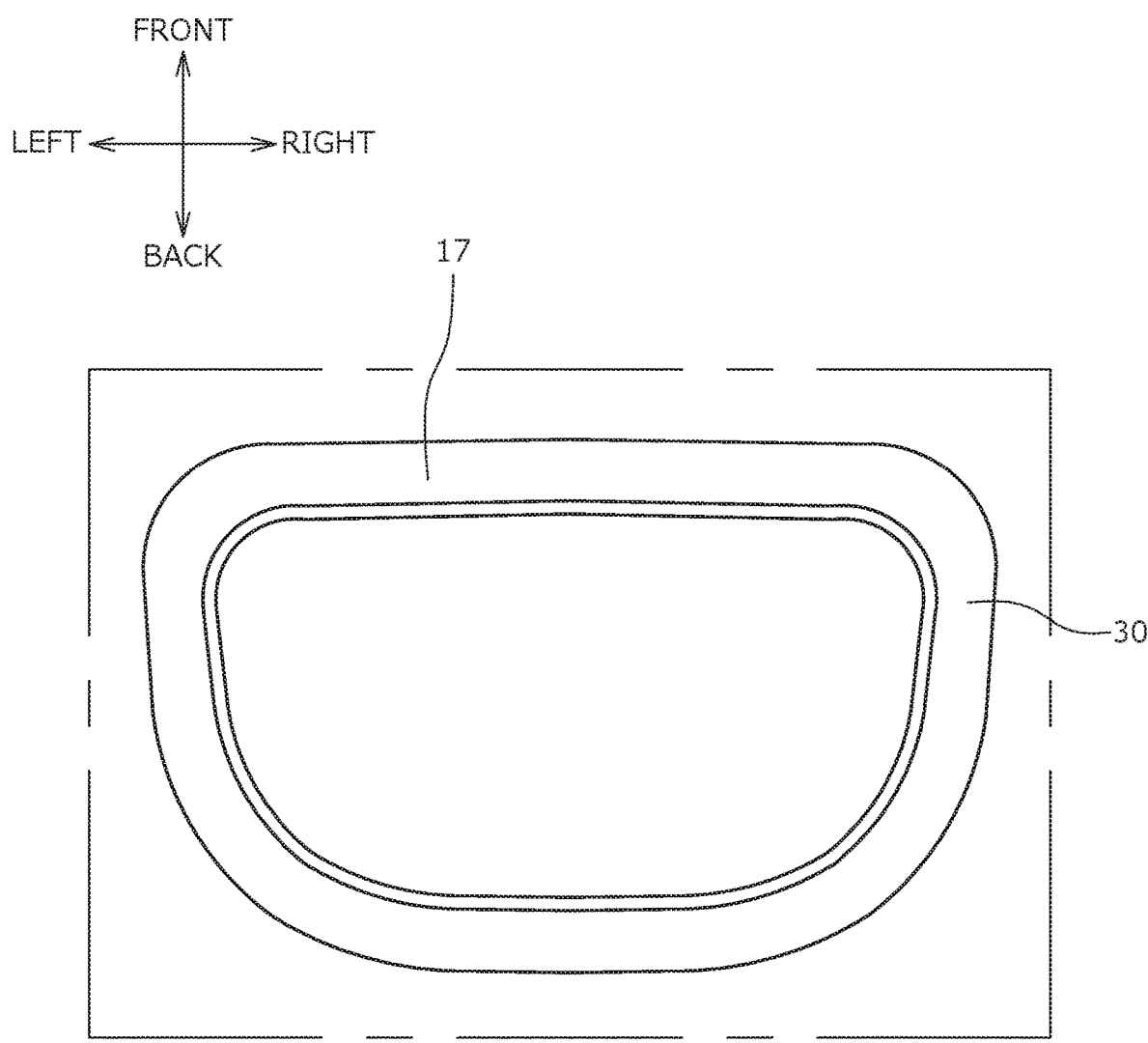
FIG. 8 is a top view of the vicinity of the cover member in FIG. 6.
Figure 10:
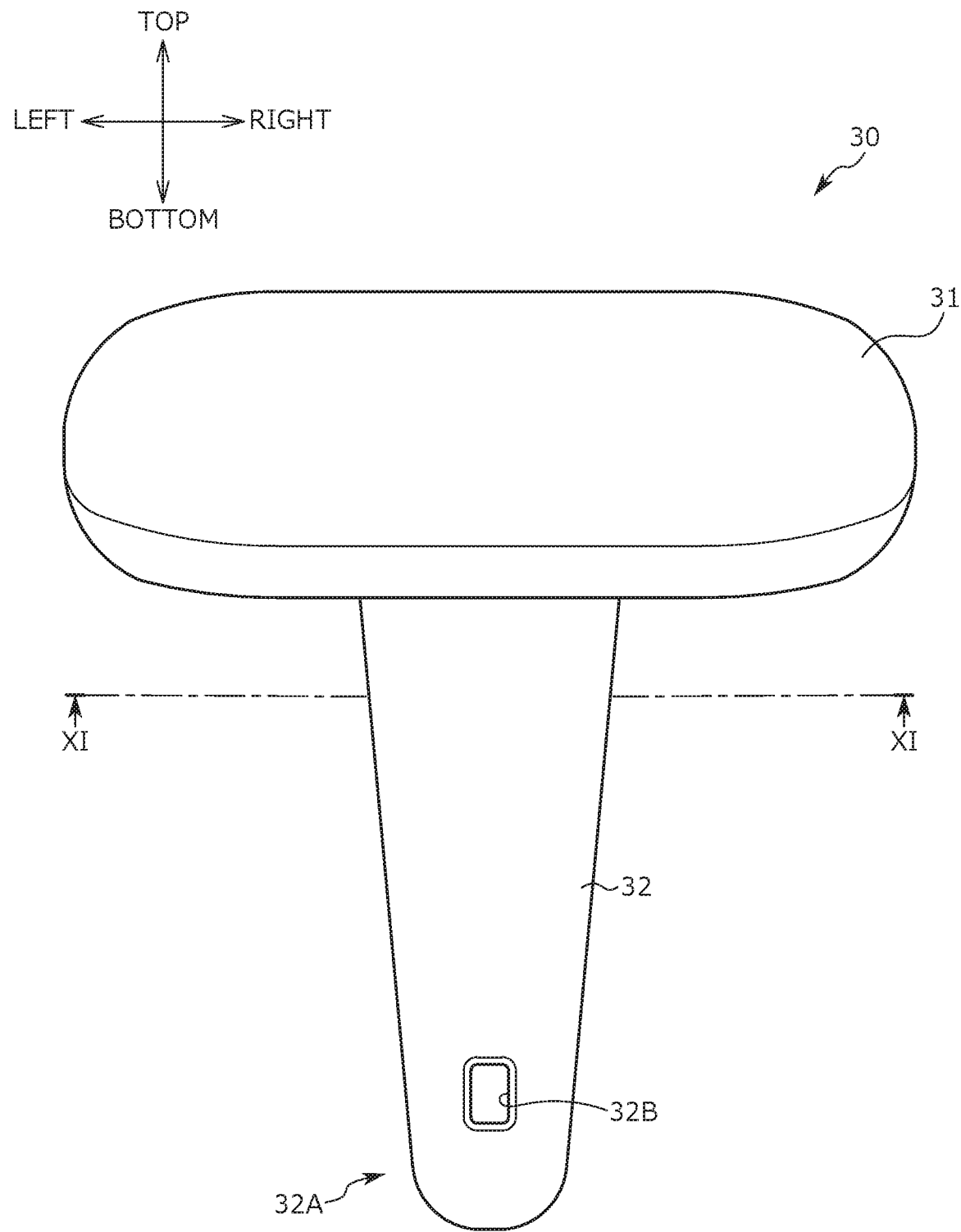
FIG. 10 is a top perspective view of the cover member.
Figure 11:
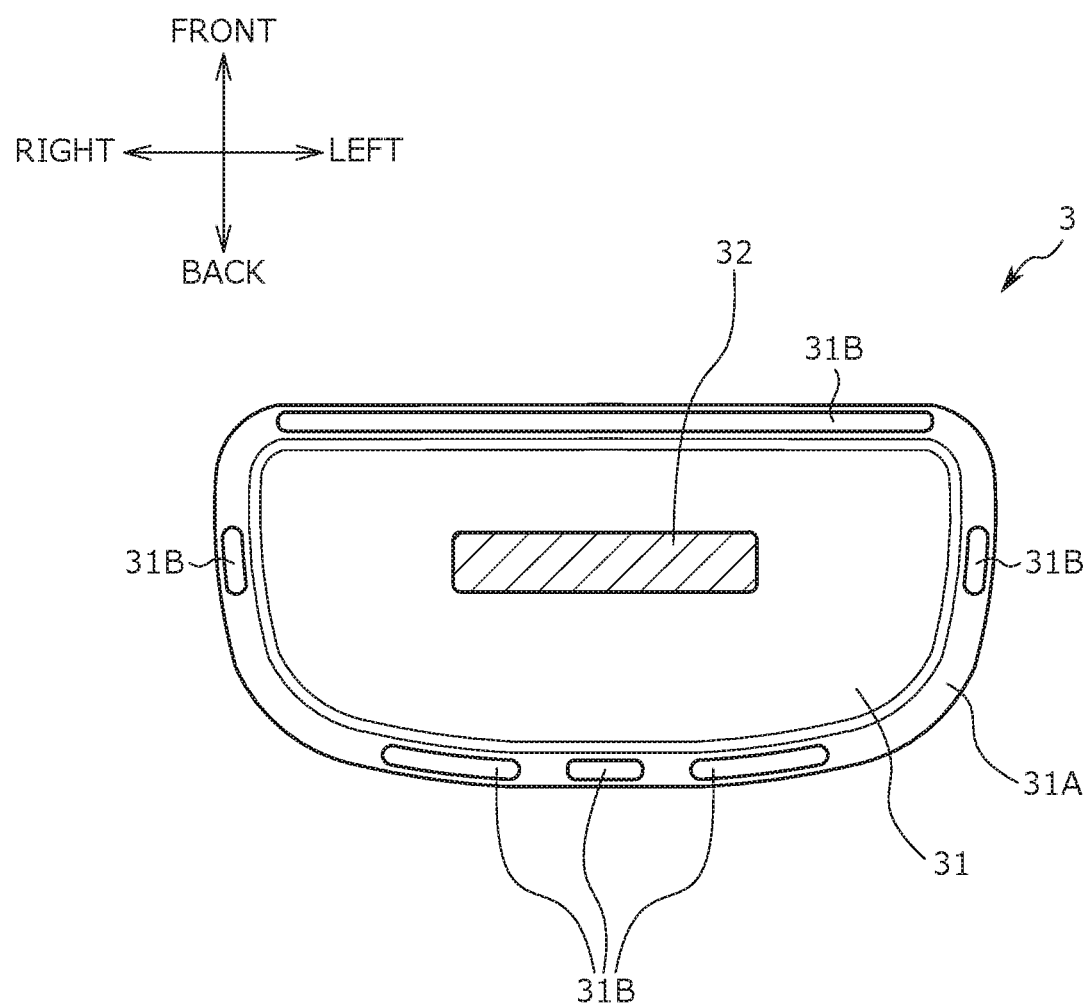
FIG. 11 is a cross sectional view made on a plane and in a direction indicated by XI in FIG. 10.

Thus, a cover member 30 shown in FIG. 10 and FIG. 11 is fit to the engagement member 17, thereby closing the through hole 19 in the seat 2 according to this embodiment. It should be noted that the state in which the cover member 30 is attached to the seat main body 3 is shown in FIG. 6 and FIG. 8.

A description will now be given of a configuration of the cover member 30. The cover member 30 includes a lid portion 31 and a downward extension portion 32 downwardly extending from the lid portion 31 as shown in FIG. 10 and FIG. 11.

The lid portion 31 is formed in a flat plate shape in an approximately rectangular shape along an inner peripheral portion of the flange portion 17A of the engagement member 17. It should be noted that a top surface of the lid portion 31 may be slightly curved to smoothly connect to the top surface of the seat main body 3 when the cover member 30 is attached to the engagement member 17.

Moreover, a flange portion 31A is provided in an outer edge portion on the bottom surface of the lid portion 31 as shown in FIG. 11. Multiple concave portions 31B are formed in the flange portion 31A. The multiple concave portions 31B are provided at positions respectively opposing multiple convex portions 17D provided inside with respect to the flange portion 17A of the engagement member 17. Then, the concave portions 31B formed in the flange portion 31A of the cover member 30 fit to the convex portions 17D of the engagement member 17 when the cover member 30 is attached to the engagement member 17.

Moreover, the downward extension portion 32 is a portion formed in a tongue-like shape that extends downward from an approximately center portion of the bottom surface of the lid portion 31. A latch hole 32B configured to latch on a T-shape (or T-like shape) protrusion 40 of the resin frame 26 is formed in an end portion 32A on a bottom side of the downward extension portion 32. The latch hole 32B is a through hole formed in an approximately rectangular shape, and a taper is formed in a periphery of the latch hole 32B so that a thickness of the downward extension portion 32 gradually decreases toward the latch hole 32B.

Moreover, a description will now be given of an attachment structure of the cover member 30 to the seat main body 3 referring to FIG. 7. The lid portion 31 of the cover member 30 engages with a top end portion of the engagement member 17, and the convex portions 17D of the engagement member 17 enter into the concave portions 31B of the flange portion 31A of the lid portion 31 as shown in FIG. 7. Consequently, backlash of the lid portion 31 of the cover member 30 when the cover member 30 is attached to the engagement member 17 can be prevented.

Figure 12:
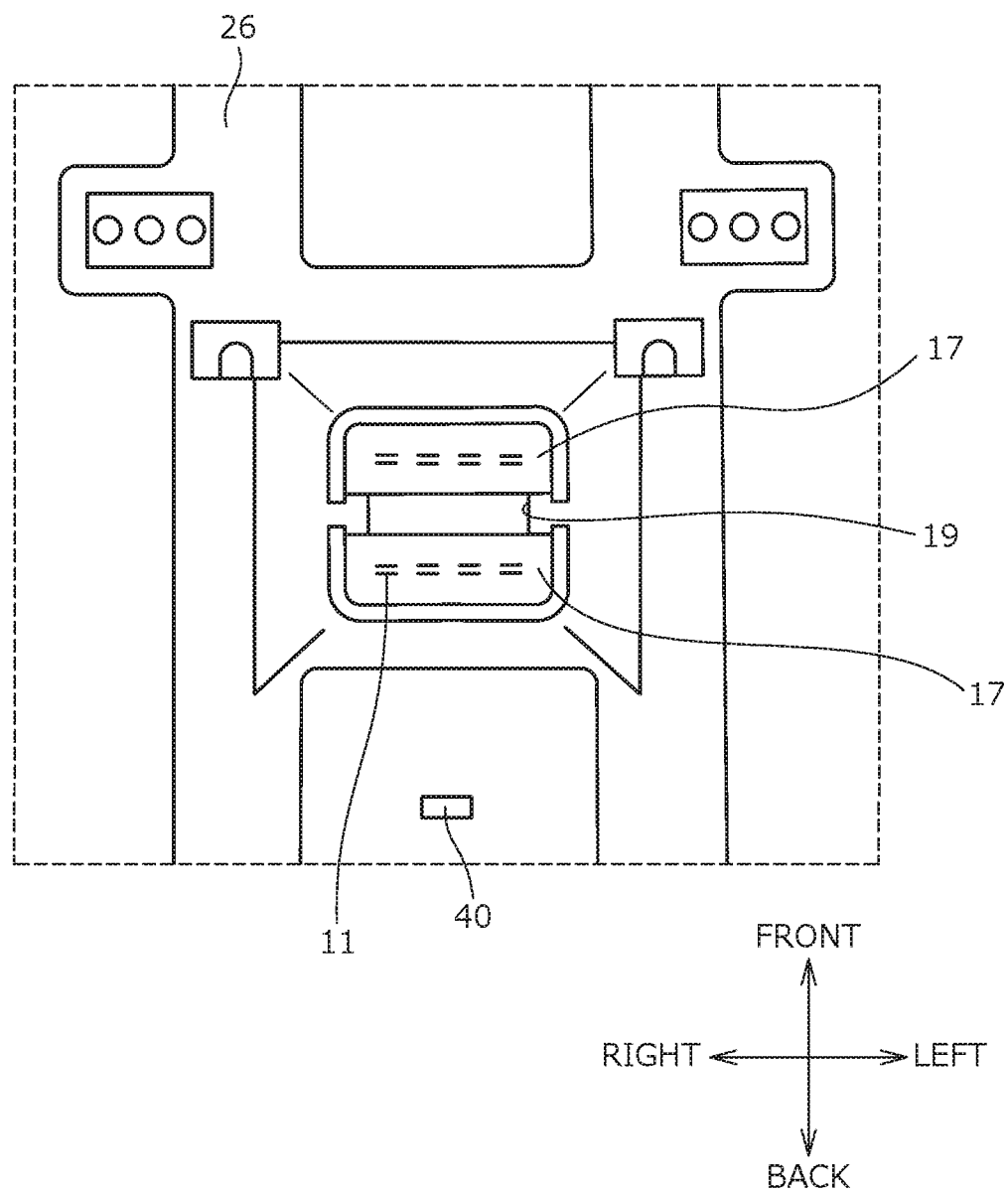
FIG. 12 is a bottom view of a periphery of a through hole in the state in which the cover member is detached.
Figure 14:
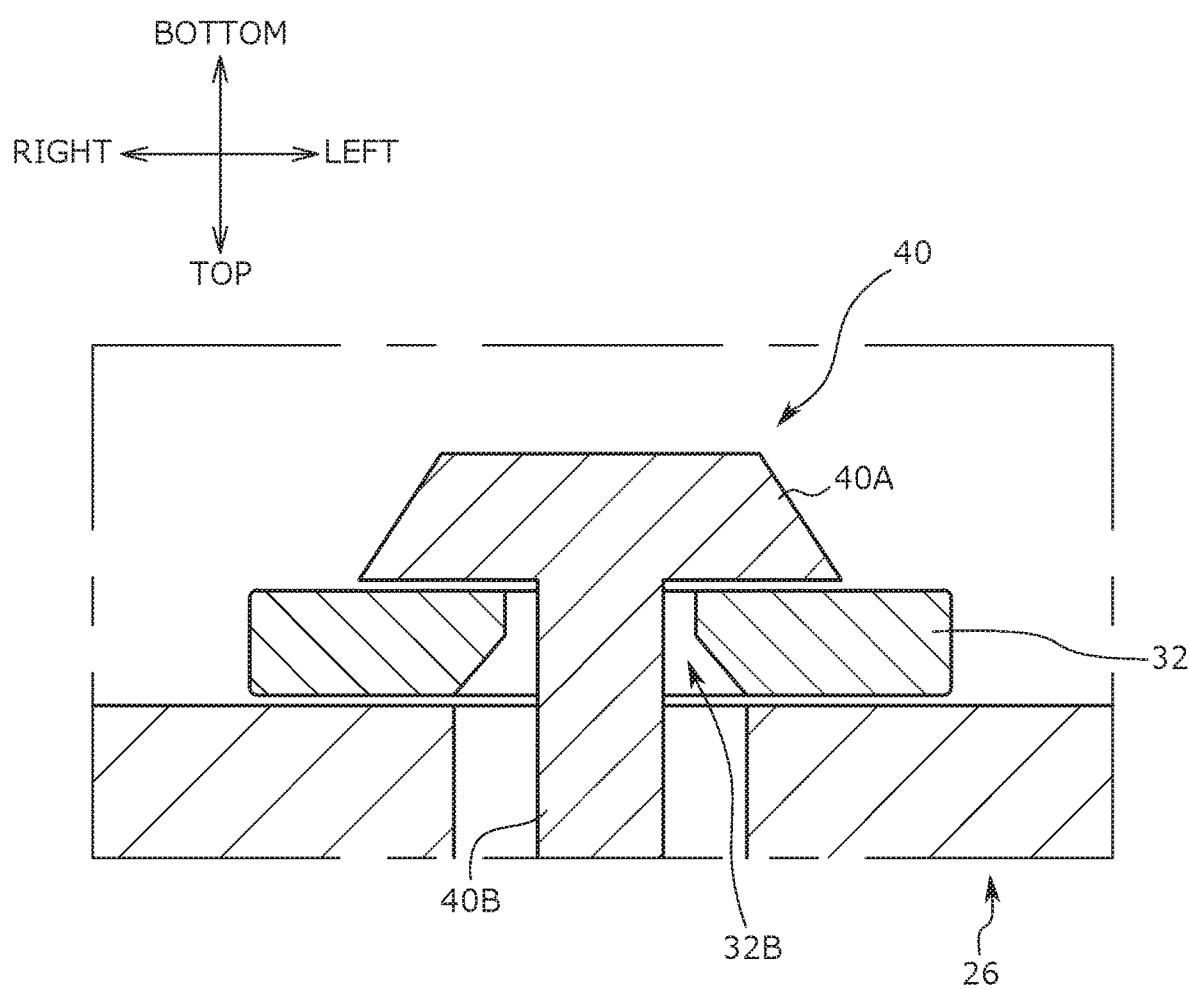
FIG. 14 is a cross sectional view made on a plane and in a direction indicated by arrows XIV in a periphery of the cover member and a lock portion of a resin frame in FIG. 13.

Moreover, the T-shape protrusion 40 protruding from the bottom surface of the resin frame 26 is formed on a seat back portion side with respect to the through hole 19 on the bottom surface of the resin frame 26 of the seat main body 3 as shown in FIG. 12. The T-shape protrusion 40 is a protrusion formed in an approximately T shape including a top-to-bottom extension portion 40B extending in the top to bottom direction and a head portion 40A extending in a horizontal direction at a distal end of the top-to-bottom extension portion 40B as shown in FIG. 14. In this embodiment, a width of the head portion 40A is wider than a width of the top-to-bottom extension portion 40B.

Figure 13:
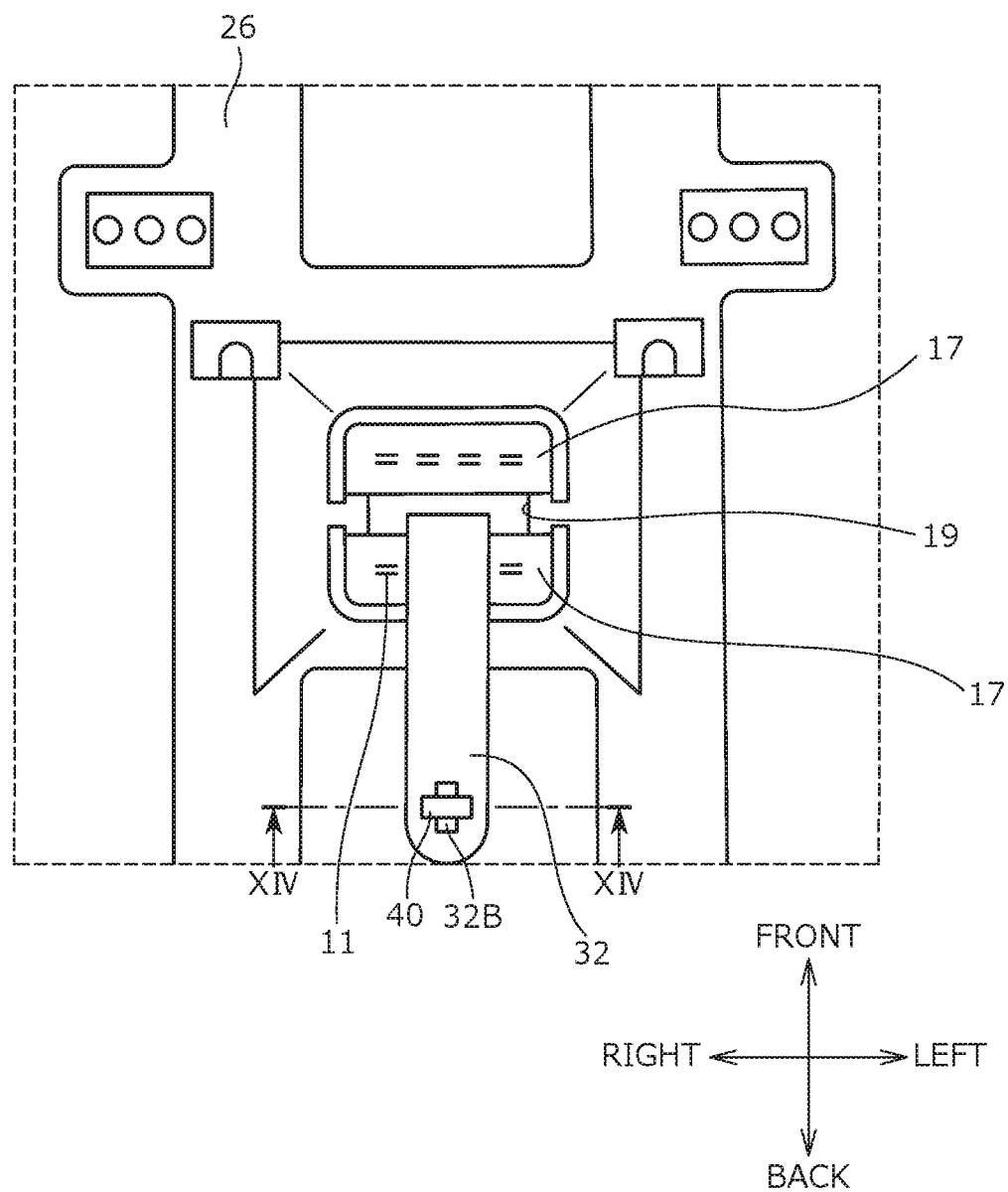
FIG. 13 is a bottom view of the periphery of the through hole in the state in which the cover member is attached.

Then, the downward extension portion 32 of the cover member 30 passes through the through hole 19, and is latched on the T-shape protrusion 40 formed on the bottom surface of the resin frame 26 as shown in FIG. 7 and FIG. 13. In this embodiment, the downward extension portion 32 is in a state curved toward the seat back portion.

Specifically, the downward extension portion 32 is latched on the T-shape protrusion 40 by inserting the head portion 40A of the T-shape protrusion 40 through the latch hole 32B formed in the end portion 32A in the tongue shape of the downward extension portion 32 as shown in FIG. 14. It should be noted that the width of the latch hole 32B is narrower than the width of the head portion 40A, and is wider than the width of the top-to-bottom extension portion 40B. With this configuration, after the end portion 32A of the downward extension portion 32 is latched on the T-shape protrusion 40, the end portion 32A is less likely to become detached from the T-shape protrusion 40. It should be noted that the downward extension portion 32 has elasticity, when the latch hole 32B is pressed over the head portion 40A in a state in which the latch hole 32B is passed over one side of the head portion 40A, the latch hole 32B elastically deforms, and widens, and the head portion 40A is consequently passed through the latch hole 32B.

Moreover, the present disclosure is not limited to the above-mentioned embodiment. A description will now be given of variations of the cover member 30.

First Variation

Figure 15:
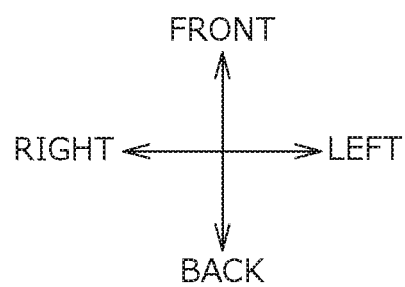
FIG. 15 is a top view of a shape of an end portion of the cover member according to a first variation.
Figure 15:
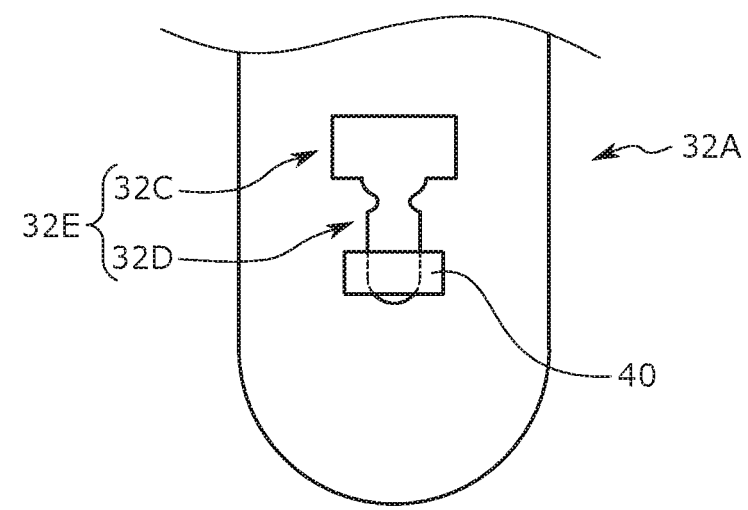

A first variation of the cover member 30 is shown in FIG. 15. The hole formed in the end portion 32A of the downward extension portion 32 of the cover member 30 may be a latch hole 32E constructed of a first opening portion 32C and a second opening portion 32D as shown in FIG. 15. It should be noted that the first opening portion 32C is wider in the width than the head portion 40A of the T-shape protrusion 40, and the second opening portion 32D is narrower in the width than the head portion 40A of the T-shape protrusion 40. Then, the end portion 32A of the downward extension portion 32 of the cover member 30 is latched on the T-shape protrusion 40 by passing the head portion 40A of the T-shape protrusion 40 through the first opening portion 32C, and then, sliding the head portion 40A toward the second opening portion 32D side.

Second Variation

Figure 16:
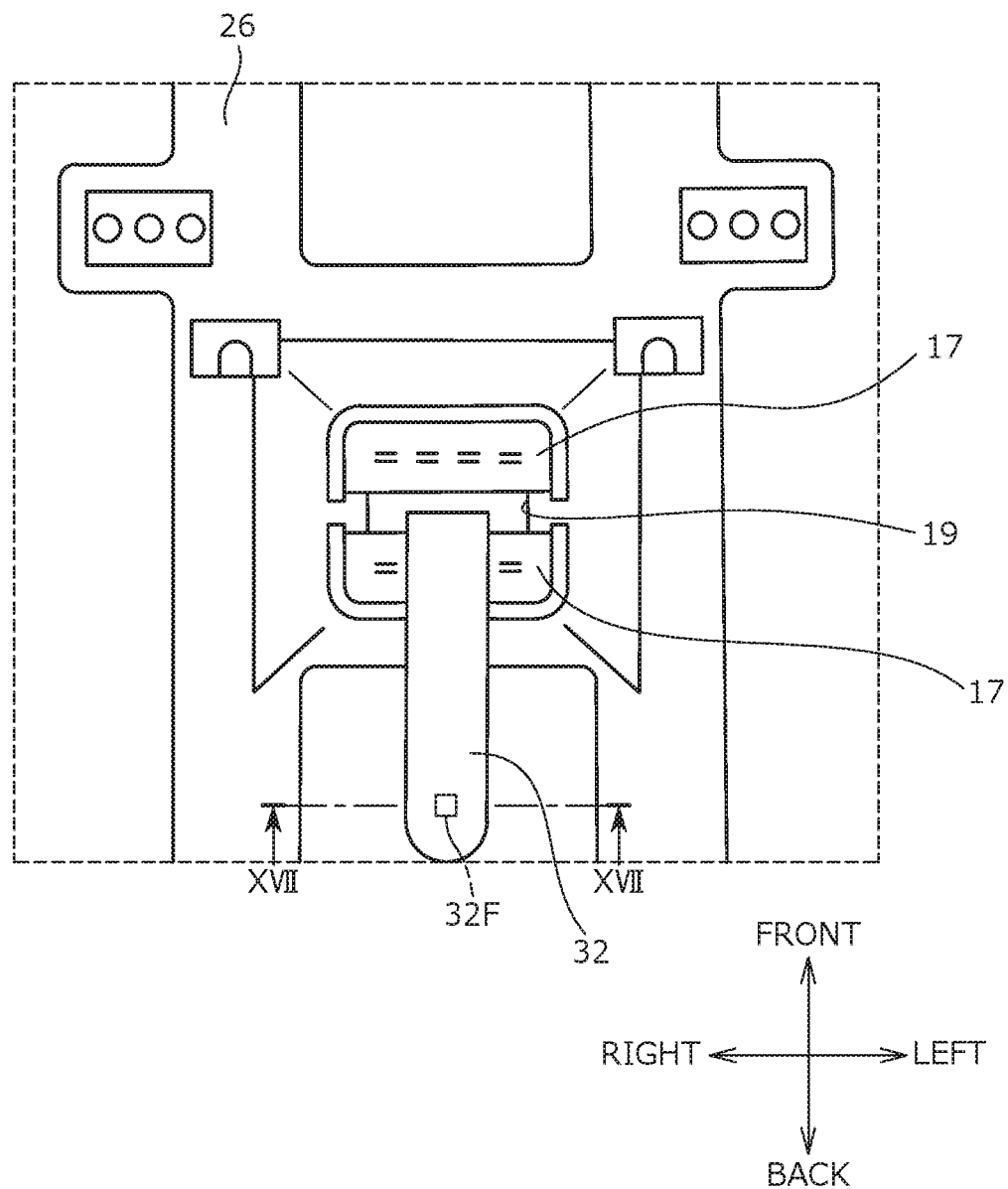
FIG. 16 is a bottom view in a state in which the cover member according to a second variation is attached.
Figure 17:
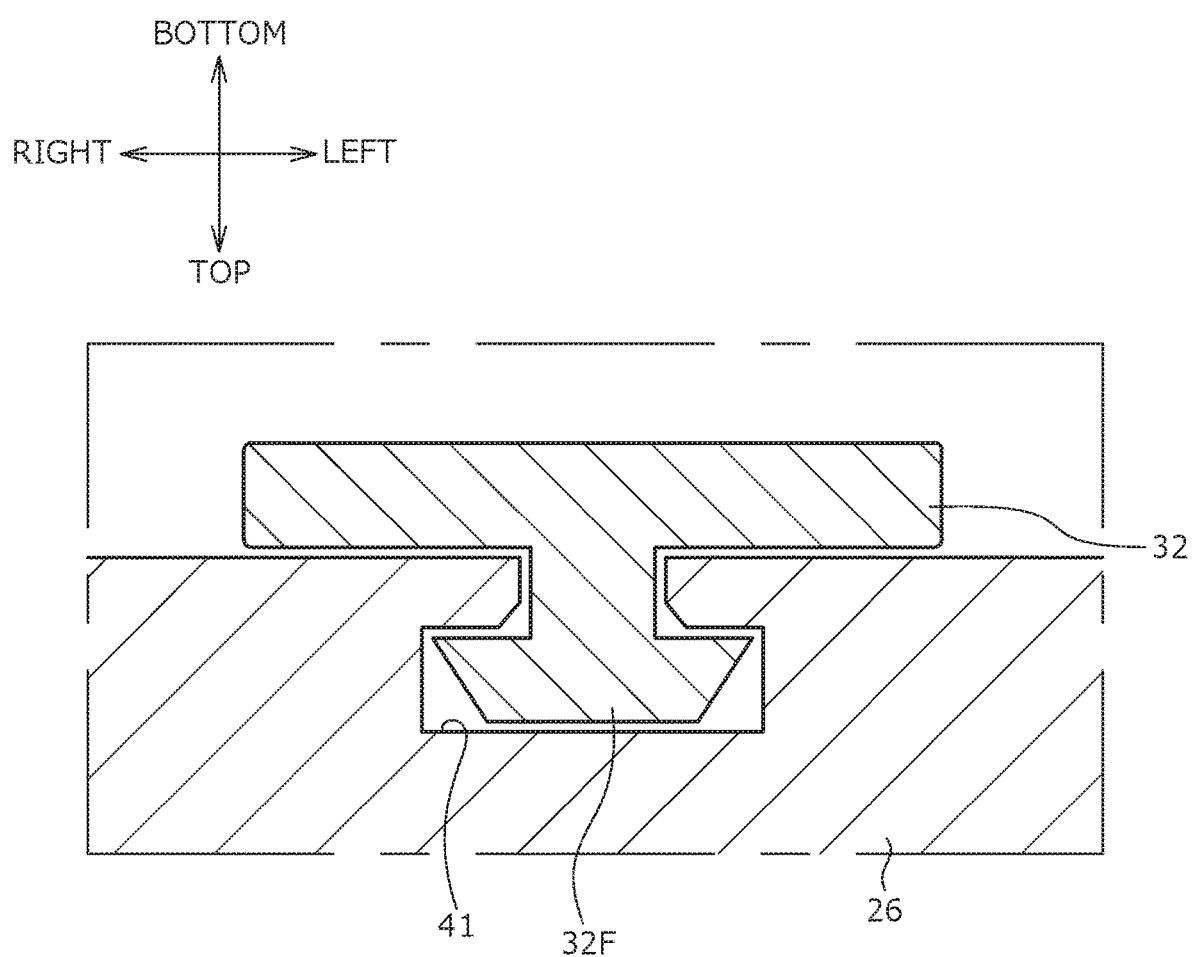
FIG. 17 is a cross sectional view made on a plane and in a direction indicated by arrows XVII in a periphery of the cover member and the lock portion of the resin frame in FIG. 16.

Moreover, a protruded portion 32F in a T shape may be provided in the downward extension portion 32, and a latch hole 41 in which the protruded portion 32F is latched may be provided on the bottom surface of the resin frame 26 as shown in FIG. 16 and FIG. 17. In this embodiment, the downward extension portion 32 is made of an elastically deformable material, and the protruded portion 32F of the downward extension portion 32 can be pushed into the latch hole 41. In this embodiment, the protruded portion 32F can be prevented from being detached from the latch hole 41 by forming an entrance of the latch hole 41 to be narrower than a width of the protruded portion 32F.

With the seat 2 described above, easy detachment of the cover member 30 can be suppressed by locking the downward extension portion 32 extending downward from the lid portion 31 of the cover member 30 for closing the through hole 19 formed in the seat main body 3 to the T-shape protrusion 40 on the bottom surface of the seat main body 3. As a result, the cover member 30 can be prevented from being detached, and crime prevention property can be increased.

Moreover, the end portion 32A of the downward extension portion 32 can be locked at the position remote from the seat surface of the seat 2 by forming the downward extension portion 32 into the tongue shape extending downward over a long distance in the seat 2. Consequently, it is difficult to detach the cover member 30 in the state in which the seat 2 is not detached from the two-wheeled motor vehicle 1.

Moreover, the downward extension portion 32 of the cover member 30 is deformable, and is locked in the curved state to the T-shape protrusion 40, and the attachment of the cover member 30 to the bottom surface of the seat main body 3 is facilitated in the seat 2.

Moreover, the mechanism of locking the cover member 30 to the bottom surface of the seat main body 3 can be implemented as a simple structure by providing the T-shape protrusion 40 on the resin frame 26, and providing the latch hole 32B in which the T-shape protrusion 40 is latched on the downward extension portion 32 of the cover member 30 in the seat 2. Moreover, an operation of attaching the cover member 30 to the bottom surface of the seat main body 3 can also be simplified.

Moreover, the detachment of the end portion 32A of the downward extension portion 32 from the T-shape protrusion 40 can be suppressed by forming the width of the head portion 40A of the T-shape protrusion 40 to be wider than the width of the latch hole 32B in the seat 2.

Moreover, the backlash of the cover member 30 can be suppressed by forming the flange portion 31A on the outer periphery of the lid portion 31 of the cover member 30 in the seat 2.

Moreover, a position displacement of the cover member can be suppressed by forming the concave portions 31B in the flange portion 31A of the lid portion 31, and forming the convex portions 17D fit to the concave portions 31B on the engagement member 17 in the seat 2. Moreover, consequently, the backlash of the cover member 30 can further be suppressed.

Moreover, the discharge of the water from the engagement member 17 via the through hole 19 is promoted by the engagement member 17 having the inclined portion 17B inclined toward the center of the through hole 19 in the seat 2. Consequently, the accumulation of the water in the engagement member 17 can be suppressed.

Moreover, the bottom end portions 17C of the engagement member 17 can be spread by fixing the bottom end portions 17C of the engagement member 17 to the bottom surface of the resin frame 26 in the seat 2. Consequently, sticking of the downward extension portion 32 of the cover member 30 to the bottom portion of the engagement member 17 can be suppressed. Moreover, the spread of the bottom end portions 17C of the engagement member 17 promotes the downward discharge of the water from the engagement member 17.

Moreover, the mechanism for locking the cover member 30 to the bottom surface of the seat main body 3 can be implemented as a simple structure by forming the protruded portion 32F on the downward extension portion 32, and forming the latch hole 41 on the bottom surface of the resin frame 26 in the seat 2. Moreover, workability of the attachment of the cover member to the bottom surface of the seat main body can also be increased. Moreover, the operation of attaching the cover member 30 to the bottom surface of the seat main body 3 is also simplified.

Moreover, the straddle-type seat according to an embodiment of the present disclosure can be applied to a seat not only for the two-wheeled motor vehicle, but also for a motor vehicle, a ship, an airplane, and the like. The component attached to the through hole 19 is not limited to the backrest 4, and may be a storage box and the like. Moreover, multiple through holes 19 may be formed in the seat main body 3, and the cover member 30 may be attached to each thereof.

TABLE OF REFERENCE NUMERALS

1: two-wheeled motor vehicle
2: seat (straddle-type seat)
3: seat main body
3a: seating portion
3b: inclined portion
3c: back portion
4: backrest
11: fixing metal fitting
13: support member
14: stay portion
14a: attachment hole
14b: weld nut
15: first bracket
16: second bracket
16a: attachment hole
17: engagement member
17A: flange portion
17B: inclined portion
17C: bottom end portion
17D: convex portion
18: fastener
19: through hole
21: cushion member
26: resin frame
30: cover member
31: lid portion
31A: flange portion
31B: concave portion
32: downward extension portion
32A: end portion
32B: latch hole
32C: first opening portion
32D: second opening portion
32E: latch hole
32F: protruded portion
40: T-shape protrusion (lock portion)
40A: head portion
40B: top-to-bottom extension portion
41: latch hole
50: first protruded portion
51: second protruded portion
52: third protruded portion
U: backrest unit

What is claimed is:

1. A straddle-type seat on which an occupant sits in a straddle state comprising:
    a seat main body configured to support a seated occupant;
    a cover member that covers a through hole formed in the seat main body, wherein the cover member comprises:
        a lid portion that closes the through hole on a top surface of the seat main body and has a flange portion formed on an outer periphery of the lid portion, and
        a downward extension portion that downwardly extends from the lid portion and is locked to a lock portion formed on a bottom surface of the seat main body; and
    an engagement member that is fixed in a state in which the engagement member is inserted into the through hole of the seat main body, and engages with the cover member;
    wherein:
    a concave portion is formed in the flange portion; and
    the engagement member comprises a convex portion configured to be fit to the concave portion of the flange portion.

2. The straddle-type seat according to claim 1, wherein:
    the downward extension portion is formed in a tongue shape; and
    an end portion of the downward extension portion is locked to the lock portion.

3. The straddle-type seat according to claim 1, wherein the downward extension portion is deformable, and is locked to the lock portion in a curved state.

4. The straddle-type seat according to claim 1, wherein:
    the lock portion is formed as a protrusion; and
    a latch hole in which the protrusion is latched is formed in the downward extension portion.

5. The straddle-type seat according to claim 4, wherein:
    the protrusion is formed in a T-like shape; and
    a width of a head portion of the protrusion is wider than a width of the latch hole.

6. The straddle-type seat according to claim 1, wherein the engagement member further comprises an inclined portion that is inclined toward a center of the through hole.

7. The straddle-type seat according to claim 1, wherein a bottom end portion of the engagement member is fixed to the bottom surface of the seat main body.

8. The straddle-type seat according to claim 1, wherein:
    the downward extension portion comprises a protruded portion formed on an end portion; and
    a latch hole in which the protruded portion is latched is formed in the lock portion.

9. The straddle-type seat according to claim 1, wherein:
a width of the downward extension portion becomes narrower toward an end portion of the downward extension portion.

10. A cover member configured to be attached to a seat main body in which a through hole is formed in a straddle-type seat that is configured to support a seated occupant in a straddle state, the cover member comprising:
a lid portion that is configured to close the through hole on a top surface of the seat main body; and
a downward extension portion that downwardly extends from the lid portion, wherein the downward extension portion is configured to be locked to a lock portion formed on a bottom surface of the seat main body, wherein:
a flange portion is formed on an outer periphery of the lid portion;
a concave portion is formed in the flange portion, the concave portion being configured to be fit to a convex portion provided in an engagement member of the seat main body.

11. A straddle-type seat on which an occupant sits in a straddle state comprising:
a seat main body configured to support a seated occupant; and
a cover member that covers a through hole formed in the seat main body, wherein:
the cover member comprises:
a lid portion that closes the through hole on a top surface of the seat main body; and
a downward extension portion that downwardly extends from the lid portion;
wherein:
the downward extension portion is formed by a single member and has a tongue shape having a predetermined width;
a latch hole is formed in an end portion of the downward extension portion;
a protrusion is formed on a bottom surface of the seat main body;
the latch hole of the downward extension portion is locked to the protrusion; and
the downward extension portion is deformable and is locked to the protrusion in a curved state.

12. The straddle-type seat according to claim 11, wherein:
the protrusion has a T-shape; and
a width of a head portion of the protrusion is larger than a width of the latch hole.

13. The straddle-type seat according to claim 11, wherein a flange portion is formed on an outer periphery of the lid portion.

14. The straddle-type seat according to claim 13, further comprising an engagement member that is fixed in a state in which the engagement member is inserted into the through hole of the seat main body, and engages with the cover member, wherein:
a concave portion is formed in the flange portion; and
the engagement member comprises a convex portion configured to be fit to the concave portion of the flange portion.

15. The straddle-type seat according to claim 14, wherein the engagement member comprises an inclined portion that is inclined toward a center of the through hole.

16. The straddle-type seat according to claim 14, wherein a bottom end portion of the engagement member is fixed to the bottom surface of the seat main body.

* * * * *